(12) United States Patent
Minamino (10) Patent No.: US 7,313,524 B1
(45) Date of Patent: *Dec. 25, 2007

(54) VOICE RECOGNITION BASED ON A GROWTH STATE OF A ROBOT

(75) Inventor: Katsuki Minamino, Tokyo (JP)

(73) Assignee: Sony Corporation, Tokyo (JP)

(*) Notice: Subject to any disclaimer, the term of this patent is extended or adjusted under 35 U.S.C. 154(b) by 565 days.

This patent is subject to a terminal disclaimer.

(21) Appl. No.: 09/723,512

(22) Filed: Nov. 28, 2000

(30) Foreign Application Priority Data

Nov. 30, 1999 (JP) .............................. P11-340468

(51) Int. Cl.
*G10L 21/00* (2006.01)
(52) U.S. Cl. ...................................... 704/270; 704/275
(58) Field of Classification Search ................ 704/260, 704/231, 272–270, 258, 275; 700/1; 382/103; 318/568.1–568.25
See application file for complete search history.

(56) References Cited

U.S. PATENT DOCUMENTS

| | | | | |
|---|---|---|---|---|
| 5,802,488 A | * | 9/1998 | Edatsune | 704/231 |
| 5,860,064 A | * | 1/1999 | Henton | 704/260 |
| 6,243,680 B1 | * | 6/2001 | Gupta et al. | 704/260 |
| 6,353,764 B1 | * | 3/2002 | Imagawa et al. | 700/1 |
| 6,446,056 B1 | * | 9/2002 | Sadakuni | 706/14 |
| 6,714,840 B2 | * | 3/2004 | Sakaue et al. | 700/245 |
| 6,754,631 B1 | * | 6/2004 | Din | 704/270 |
| 6,766,036 B1 | * | 7/2004 | Pryor | 382/103 |

* cited by examiner

*Primary Examiner*—Michael Opsasnick
(74) *Attorney, Agent, or Firm*—Frommer Lawrence & Haug LLP; William S. Frommer; Thomas F. Presson (57) ABSTRACT

A voice recognition apparatus used in a robot performs voice recognition in different manners depending upon the growth state of the robot thereby allowing the robot to provide better entertainment to a user. A growth score setting unit sets growth scores to respective words described in a word dictionary stored in a dictionary memory. A matching unit performs voice recognition for the words included in the word dictionary, taking into account the growth scores defined for the respective words.

8 Claims, 8 Drawing Sheets

| WORD | PHONETIC INFORMATION | GROWTH SCORE |
|---|---|---|
| 走れ (RUN) | hashire | 10 |
| 起きろ (GET UP) | okiro | 20 |
| 歩け (WALK) | aruke | 30 |
| お手 (SHAKE HANDS) | ote | 40 |
| お座り (SIT DOWN) | osuwari | 50 |
| ⋮ | ⋮ | ⋮ |

| GROWTH STATUS | GROWTH SCORE | | | |
|---|---|---|---|---|
| | DICTIONARY $D_1$ | DICTIONARY $D_2$ | .......... | DICTIONARY $D_Q$ |
| $NODE_0$ | | | | |
| $NODE_1$ | | | | |
| ⋮ | ⋮ | ⋮ | ⋮ | ⋮ |
| $NODE_G$ | | | | |

FIG. 11

| WORD | PHONETIC INFORMATION | ALTERNATIVE WORDS |
|---|---|---|
| | | |

VOICE RECOGNITION BASED ON A GROWTH STATE OF A ROBOT

BACKGROUND OF THE INVENTION

1. Field of the Invention

The present invention relates to a voice recognition apparatus, a voice recognition method, and a storage medium. More specifically, the present invention relates to a voice recognition apparatus, a voice recognition method, and a storage medium, which are advantageous when used in a robot having a voice recognition capability.

2. Description of the Related Art

In the art of voice recognition, it is known to determine an acoustic score and a linguistic score in accordance with an acoustic model, a dictionary, and a grammar thereby determining a voice recognition result in the form of a word sequence for an input voice. In robotics, it is known to control the operation of a robot used for FA (factory automation) or the like in accordance with a command signal. It is also known to combine the above-described voice recognition technique and robot control technique to realize a system in which the operation of a robot is controlled in accordance with the result of voice recognition. Such a technique is used in, for example, a goods assorting system to change the destinations of goods using the voice recognition. Furthermore, in recent years, the control of apparatus using voice recognition has become very popular not only in robotics but also in computer systems in which computers are controlled using voice recognition.

Furthermore, besides the industrial robots described above, entertainment robots serving as pet robots (some of them are formed in stuffed shapes) capable of recognizing a speech made of a user and behaving in various manners depending upon the recognition result are available on the market.

It is desirable that entertainment robots grow in a similar manner to actual pets thereby providing greater entertainment to users. For example, it is desirable that a robot do not understand any speech made by a user at first, and the robot gradually become able to understand speeches made by the user as the robot grows. This results in a great improvement in entertainment of the robot.

SUMMARY OF THE INVENTION

In view of the above, it is an object of the present invention to provide a technique to perform voice recognition in different manners depending upon the state, such as the growth state, of a robot.

According to an aspect of the present invention, there is provided a voice recognition apparatus comprising: voice recognition means for recognize a voice; and control means for controlling the voice recognition means in accordance with the state of a robot.

The control means preferably controls the voice recognition means in accordance with the state of the robot in terms of the growth, emotion, or instinct.

The control means may change the recognition accuracy of the voice recognition means in accordance with the state of the robot.

Preferably, the voice recognition means includes dictionary storage means for storing a dictionary in which words to be recognized in voice recognition are described, and the control means controls the voice recognition means such that the words described in the dictionary are weighted in accordance with the state of the robot and voice recognition is performed using the weighted words.

The voice recognition means may include dictionary storage means for storing a plurality of dictionaries in which words to be recognized in voice recognition are described such that the words to be recognized are divided into groups and the respective groups of words are stored in different dictionaries, and the control means may control the voice recognition means such that the words described in the dictionary are weighted in accordance with the state of the robot and voice recognition is performed using the weighted words.

The voice recognition means may include dictionary storage means for storing a dictionary in which words to be recognized in voice recognition are described such that other words are linked to the words to be recognized, and the control means may control the voice recognition means such that another word linked to a word, which is included in the dictionary and which is obtained as a voice recognition result, is output as a final voice recognition word depending upon the state of the robot.

Words to be recognized in voice recognition may be described in the dictionary such that the words are linked to other acoustically or semantically similar words.

The voice recognition means may include dictionary storage means for storing a dictionary in which words to be recognized in voice recognition are described, and the control means may control the maximum number of words allowed to be described in the dictionary, in accordance with the state of the robot.

The robot may perform a predetermined action in accordance with the voice recognition result output by the voice recognition means.

According to another aspect of the present invention, there is provided a voice recognition method comprising the steps of: recognizing a voice; and controlling the voice recognition step in accordance with the state of a robot.

According to still another aspect of the present invention, there is provided a storage means including a program stored thereon, the program comprising the steps of: recognizing a voice; and controlling the voice recognition step in accordance with the state of a robot.

In the voice recognition apparatus, the voice recognition method, and the storage medium, according to the present invention, voice recognition is controlled depending upon the state of a robot.

DESCRIPTION OF THE PREFERRED EMBODIMENTS

Figure 1:
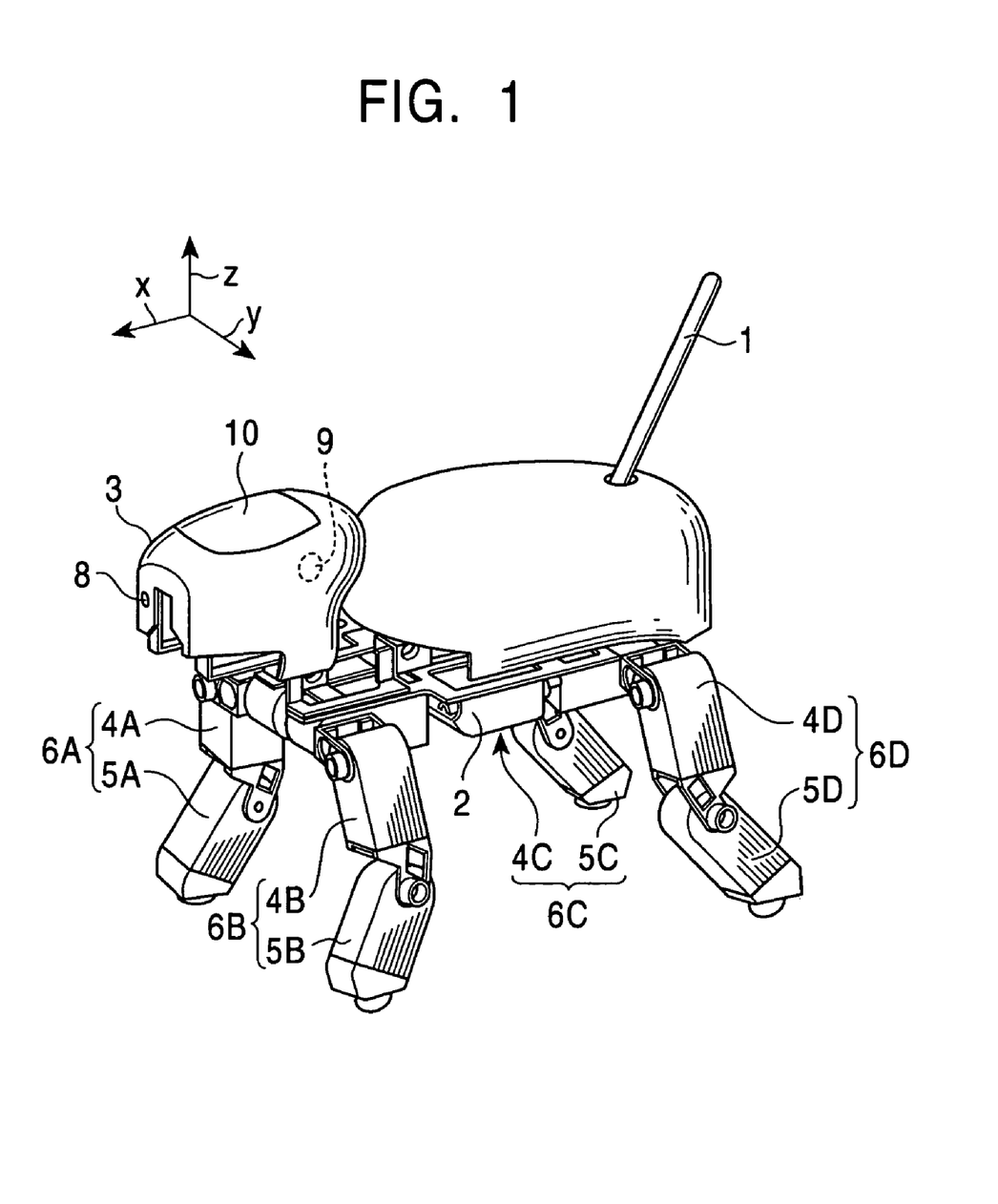
FIG. 1 is a perspective view illustrating the outward appearance of a robot according to an embodiment of the present invention.
Figure 2:
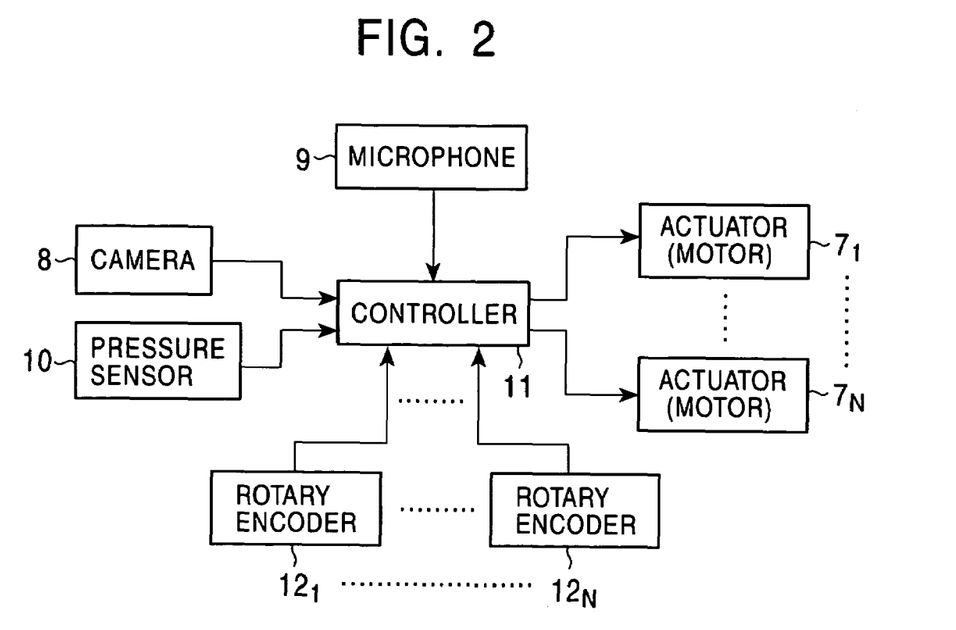
FIG. 2 is a block diagram illustrating the internal structure of the robot.

FIG. 1 illustrates an example of the outward appearance of a robot according to an embodiment of the present invention, and FIG. 2 illustrates an example of the electrical configuration thereof.

In the present embodiment, the robot is formed in the shape of a dog. A head unit 3 is disposed on the front end of a body unit 2. Leg units 6A, 6B, 6C, and 6D including thigh units 4A, 4B, 4C, and 4D and shank units 5A, 5B, 5C, and 5D, respectively, are attached to the body unit 2, at respective four corners of the body unit 2. A tail unit 1 is attached to the body unit 2, on the back end thereof.

Motors $7_1$ to $7_N$ serving as actuators are disposed in joint mechanisms between the tail unit 1 and the body unit 2, between the head unit 3 and the body unit 2, between the respective thigh units 4A to 4D and the body unit 2, and between the respective thigh units 4A to 4D and the corresponding shank units 5A to 5D. By driving the motors $7_1$ to $7_N$, the tail unit 1 and the head unit 3 can be freely rotated about three axes, the x axis, y axis, and z axis, the leg units 4A to 4D about two axes, the x axis and y axis, and the shank units 5A to 5D about one axis, the x axis, thereby allowing the robot to act in various manners.

The head unit 3 includes a camera (CCD (charge coupled device) camera) 8, a microphone 9, and a pressure sensor 10, disposed at particular locations. The body unit 2 includes a controller 11 disposed in the inside thereof. The camera 8 takes an image of the surroundings including a user, and the microphone 9 senses sounds including voices of the user in the surroundings. The pressure sensor 10 detects a pressure applied by the user. The image of the surroundings taken by the camera 8, the sounds in the surroundings sensed by the microphone 9, and the pressure applied by the user to the head, sensed by the pressure sensor 10, are supplied as image data, voice data, and pressure data, respectively, to the controller 11.

Rotary encoders $12_1$ to $12_N$ are disposed on the respective motors $7_1$ to $7_N$ disposed in the joint mechanisms so that the rotational angles of the rotational shafts of the respective motors $7_1$ to $7_N$ are detected by the rotary encoders $12_1$ to $12_N$. The rotational angles detected by the rotary encoders $12_1$ to $12_N$ are applied as the detected angle data to the controller 11.

The controller 11 determines the attitude of the robot and the situation of the environment on the basis of the image data from the camera 8, the voice data from the microphone 9, the pressure data from the pressure sensor 10, and the rotational angle data from the rotary encoders $12_1$ to $12_N$. Furthermore, the controller 11 determines the action to be performed, on the basis of the above data and in accordance with a control program which has been installed in advance. In accordance with the determination, the controller 11 drives particular motors, which should be driven to perform the above action, of the motors $7_1$ to $7_N$.

Thus, the robot acts autonomously while moving the tail unit 1, the head unit 2, and the legs 6A to 6D.

Figure 3:
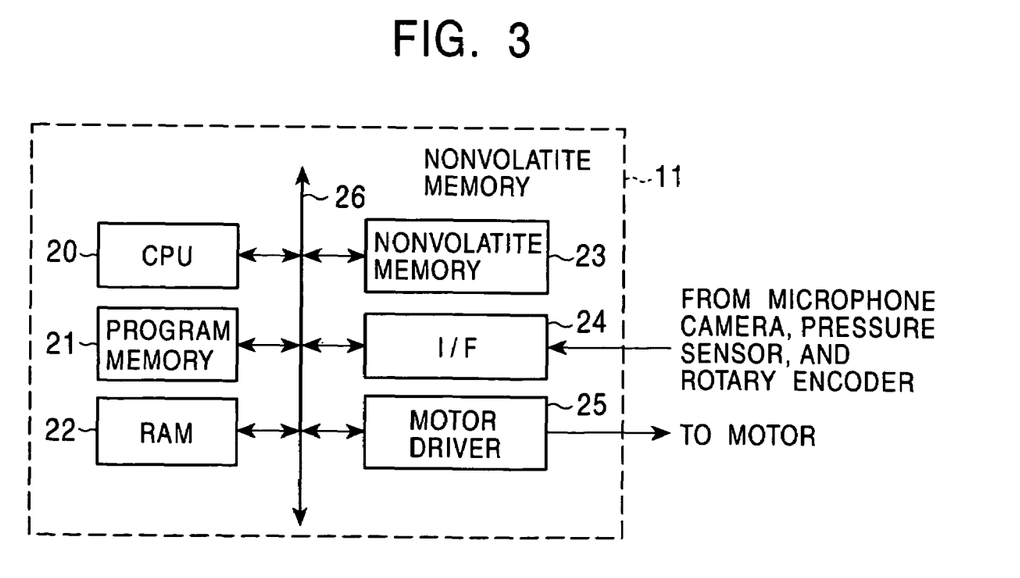
FIG. 3 is a block diagram illustrating an example of the hardware configuration of a controller.

FIG. 3 illustrates an example of the configuration of the controller 11 shown in FIG. 2.

The controller 11 includes a CPU (central processing unit) 20, a program memory 21, a RAM (random access memory) 22, a nonvolatile memory 23, an interface (I/F) circuit 24, and a motor driver 25, wherein those parts are connected to each other via a bus 26.

The CPU (central processing unit) 20 controls the action of the robot by executing a control program stored in the program memory 21. The program memory 21 for storing the control program executed by the CPU 20 and other necessary data may be realized by an EEPROM (electrically erasable programmable read only memory) or the like. The RAM 22 serves to temporarily store data needed in the operation performed by the CPU 20. The nonvolatile memory 23 is used to store data associated with an emotion/instinct model, an action model, a growth model, a word dictionary, an acoustic model, a grammar, and the like, which are needed to be retained even after the electric power is turned off. The interface circuit 24 receives data supplied from the camera 8, the microphone 9, the pressure sensor 10, and the rotary encoders $12_1$ to $12_N$ and transfers the received data to the CPU 20. Under the control of the CPU 20, the motor driver 25 supplies driving signals to the motors $7_1$ to $7_N$ thereby driving them.

Figure 4:
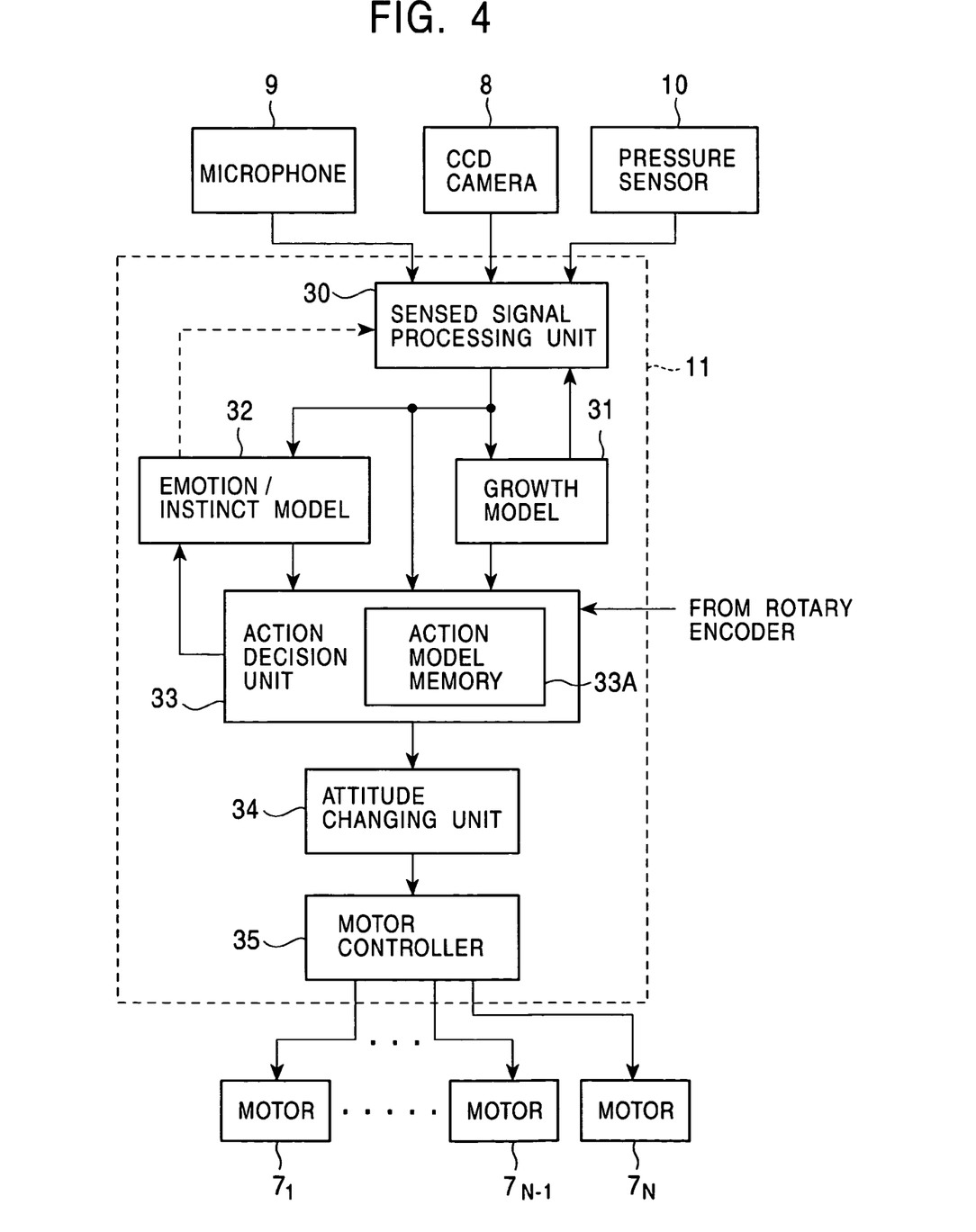
FIG. 4 is a block diagram illustrating an example of the functional configuration of the controller, wherein the functions thereof are realized by the controller by executing a program.

The controller 11 has the functional configuration such as that shown in FIG. 4, which is achieved by executing the control program stored in the program memory 21 by the CPU 20 thereby controlling the actions of the robot.

That is, FIG. 4 illustrates an example of the functional configuration of the controller 11.

The sensed signal processing unit 30 recognizes stimuli applied from the outside and the state of the surrounding environment on the basis of the signals output from the microphone 9, the camera 8, and the pressure sensor 10. The resultant information is supplied to the growth model unit 31, the emotion/instinct model unit 32, and the action decision unit 33. The output of the growth model unit 21 is fed back, as required, to the sensed signal processing unit 30 thereby controlling the operation of the sensed signal processing unit 30, as will be described later in further detail.

The growth model unit 31 provides the growth model representing the growth of the robot. The growth model unit 31 modifies the growth state in accordance with the output of the sensed signal processing unit 30 and depending upon the elapsed time. The information about the modified growth status is supplied to the sensed signal processing unit 30 and the action decision unit 33.

The emotion/instinct model unit 32 provides the emotion model and the instinct model representing the state of the emotion and instinct of the robot. The emotion/instinct model unit 32 changes the parameters which define the emotion model and the instinct model, in accordance with the output of the sensed signal processing unit 30 and the output of the action decision unit 33 and depending upon the elapsed time, thereby changing the state of the emotion and the instinct of the robot. The information about the changed state of the emotion and the instinct is supplied to the action decision unit 33.

The action decision unit 33 includes an action model memory 33A. The action decision unit 33 decides the action to be performed by the robot in accordance with the content stored in the action model memory 33A, the output of the sensed signal processing unit 30, the growth model provided by the growth model unit 31, the emotion/instinct model provided by the emotion/instinct model unit 32, and the elapsed time. The information about the action to be performed (hereinafter also referred to simply as action information) is supplied to the attitude changing unit 34.

The attitude changing unit 34 calculates the control data associated with the rotational angle and the rotational speed required to make the robot perform an action corresponding to the action information supplied from the action decision unit 33. The resultant control data is supplied to the motor control unit 35.

The motor controller 35 drives the motors $7_1$ to $7_N$ so that they rotate in accordance with the control data supplied from the attitude changing unit 34.

In the controller 11 configured in the above-described manner, the sensed signal processing unit 30 recognizes particular environmental conditions, actions applied by the user to the robot, commands issued by the user, and the like, on the basis of the image data supplied from the camera 8, the voice data supplied from the microphone 9, and the pressure data supplied from the pressure sensor 10. The recognition result is supplied to the growth model unit 31, the emotion/instinct model unit 32, and the action decision unit 33.

More specifically, the sensed signal processing unit 30 performs image recognition on the basis of the image data output from the camera 8 thereby recognizing the existence of, for example, a "ball" or a "wall". The recognition result is supplied to the growth model unit 31, the emotion/instinct model unit 32, and the action decision unit 33. The sensed signal processing unit 30 also performs voice recognition on the basis of the voice data output from the microphone 9, and the voice recognition result is supplied to the growth model unit 31, the emotion/instinct model unit 32, and the action decision unit 33. Furthermore, the sensed signal processing unit 30 processes the pressure data output from the pressure sensor 10. If a pressure greater than a threshold value is detected for a short period of time, the sensed processing unit 30 recognizes that the robot is hit (scolded). If the detected pressure has a magnitude lower than a threshold value and continues for a long period of time, the sensed signal processing unit 30 recognizes that the robot is stroked. In any case, the recognition result is supplied to the growth model unit 31, the emotion/instinct model unit 32, and the action decision unit 33.

The growth model unit 31 provides the growth model which defines the growth state of the robot. The growth model is realized by an automaton such as that shown in FIG. 5A. In the automaton shown in FIG. 5A, the growth states are represented by nodes (states) $NODE_0$ to $NODE_G$, and growth, that is, transition between growth states, is represented by transition from $NODE_G$ corresponding to a certain growth state to $NODE_{g+1}$ corresponding to the next growth state, wherein the transition from $NODE_G$ to $NODE_{g+1}$ is represented by an arc denoted, in FIG. 5A, by $ARC_{g+1}$ (g=0, 1, ..., G−1).

Figure 5:
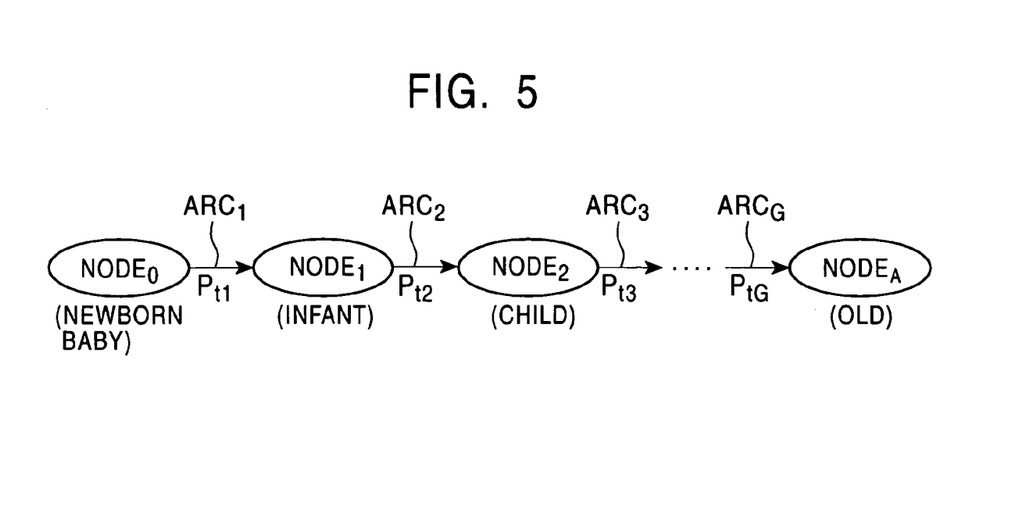
FIG. 5 is a schematic diagram illustrating a growth model.

In FIG. 5A (also in FIG. 5B which will be referred to later), transitions between growth states occur node by node in the direction from left to right. More specifically, the leftmost node in FIG. 5A, that is, $NODE_0$ represents a "newborn baby" state, the second node $NODE_1$ represents an "infant" state, and the third node $NODE_2$ represents a "child" state. Similarly, in the following nodes, the growth level increases with the location of the nodes in the direction from left to right, and the node $NODE_G$ at the right most position represents an old age state.

Conditions (input) $P_{tg+1}$ required for transition are set to an arc $ARC_{g+1}$ extending from $NODE_G$ to adjacent $NODE_{g+1}$ on the right side. According to this condition, it is determined whether a node-to-node transition (growth) should be made. More specifically, the conditions $P_{tg+1}$ in terms of the output of the camera 8, the output of the microphone 9, the output of the pressure sensor 10, and the elapsed time which are required for transition are defined for the $ARC_{g+1}$. If the conditions $P_{tg+1}$ are satisfied, transition occurs from $NODE_G$ to adjacent $NODE_{g+1}$ on the right side, and thus the robot grows.

In the growth model shown in FIG. 5A, node-by-node transitions occur along a single fixed path in the direction from left to right, and thus the growth process is limited to that along this single path. Alternatively, the growth model may have a plurality of growth paths as shown in FIG. 5B.

Figure 5B:
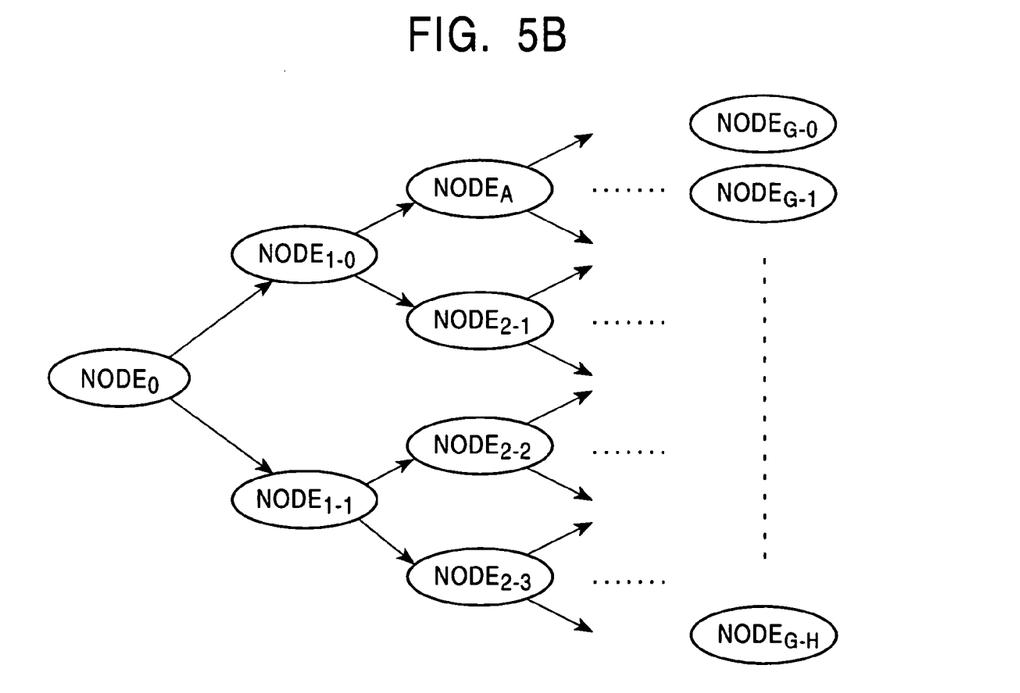

In the example shown in FIG. 5B, the growth model has a tree structure in which $NODE_0$ corresponding to the "newborn baby" state has two transition paths to $NODE_{1-0}$ and $NODE_{1-1}$, respectively, corresponding to the "infant" states. These two nodes $NODE_{1-0}$ and $NODE_{1-1}$, corresponding to the "infant" states have different characters, and it is determined to which of nodes $NODE_{1-0}$ and $NODE_{1-1}$ transition should occur, depending upon the output of the camera 8, the output of the microphone 9, the output of the pressure sensor 10, and the elapsed time. That is, the robot has a different growth process depending upon the stimuli applied to the robot.

The structure of the growth model is not limited to the tree structure. Any other structure such as a graph structure may also be employed, as long as it can be represented by an automaton.

In accordance with the growth model described above, the growth model unit 31 controls the growth state of the robot, and outputs the information representing the current growth state to the sensed signal processing unit 30 and the action decision unit 33.

The emotion/instinct model unit 32 provides the emotion model which represents the state of the emotion of the robot, such as "happiness", "sadness", and "anger". The emotion/instinct model unit 32 also provides the instinct model representing the state of the instinct, such as "appetite", desire for "sleep", and desire for exercise".

More specifically, the emotion model and the instinct model represent the states of the emotion and the instinct of the robot by integers within the range from 0 to 100. The emotion/instinct model unit 32 changes the values representing the states of emotion and instinct of the robot, depending upon the output of the sensed signal processing unit 30, the output of the action decision unit 33, and the elapsed time. That is, the states of the emotion and the instinct of the robot change depending upon the environmental conditions recognized via the sensed signal processing unit 30, the output of the action decision unit 33, and the elapsed time. The changed values of representing the states of the emotion and the instinct of the robot is supplied from the emotion/instinct model unit 32 to the action decision unit 33.

The emotion model and the instinct model may also be represented by an automaton or the like.

The states of the emotion and the instinct of the robot are changed in accordance with the output of the action decision unit 33, as follows.

The action decision unit 33 supplies, to the emotion/instinct model unit 32, action information representing the action (for example, turning away) being now preferred by the robot or the actions which were performed in the past.

Let us assume that the robot turned away in response to a stimulus applied by a user to the robot in a high anger level. In this case, the action decision unit 33 supplies action information indicating that the robot has turned away to the instinct/instinct model unit 32.

In general, an action such as turning wary representing a bad mood can reduce the anger to some extent. In view of the above, if the emotion/instinct mode unit 32 receives the action information indicating that the robot has turned away from the action decision unit 33, the emotion/instinct mode unit 32 reduces the value representing the anger level in the emotion model.

The action decision unit 33 decides the action to be performed next, in accordance with the environmental conditions recognized by the sensed signal processing unit 30, the growth model provided by the growth model unit 31, the emotion model and the instinct model provided by the emotion/instinct model unit 32, the content of the action model storage unit 33A, and the elapsed time. The action information representing the action to be performed next is supplied to the emotion/instinct model unit 32 and the attitude changing unit 34.

Figure 6:
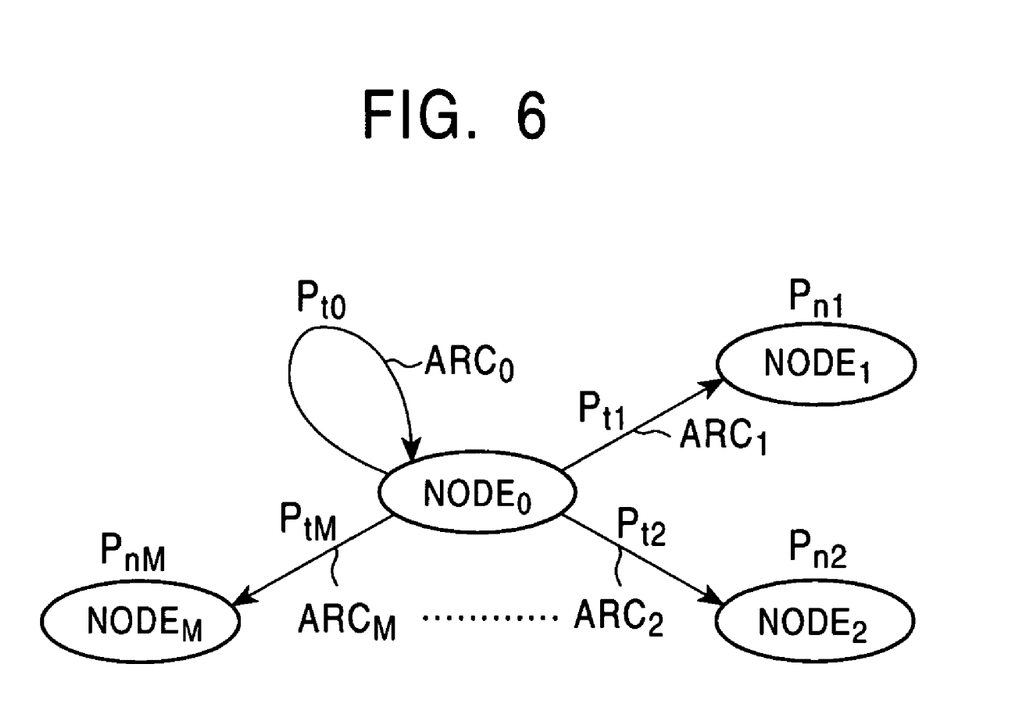
FIG. 6 is a schematic diagram illustrating an action model.

The action model storage unit 33A stores the action model, such as that shown in FIG. 6, which defines the actions of the robot.

In the present embodiment, the action model is represented by, for example, a probabilistic automaton. In the probabilistic automaton, actions are represented by nodes (states) $NODE_0$ to $NODE_M$, and a change in action is represented by a transition from a certain node $NODE_{m0}$ corresponding to a certain action to another node $NODE_{m1}$ corresponding to another action, wherein the transition from $NODE_{m0}$ to $NODE_{m1}$ is represented by an arc denoted, in FIG. 6, by $ARC_{m1}$ (where m0, m1=0, 1, . . . , M).

Note that, in FIG. 6, the probabilistic automaton is represented in a simplified fashion in which, of various nodes of the probabilistic automaton including M+1 nodes, only $NODE_0$ and $NODE_0$ to $NODE_M$ which are destination nodes of transitions from $NODE_0$ are shown.

The transition probability $P_{tm1}$ representing the probability of transition from $NODE_{m0}$ to $NODE_{m1}$ is set to the arc $ARC_{m1}$ from $NODE_{m0}$ to $NODE_{m1}$, and the occurrence probability $P_{nm}$ representing the probability that the action corresponding to $NODE_M$ occurs is set to $NODE_M$ (m=0, 1, . . . , M). In this action mode, the action to be performed next is determined on the basis of the transition probability set to the arcs and the occurrence probabilities set to the nodes.

The action decision unit 33 decides to which node transition is to occur from the current node corresponding to the action being now performed, on the basis of the transition probabilities set to the arcs extending from the current node, the occurrence probabilities set to the nodes pointed to by the respective arcs, the growth model provided by the growth model unit 31, the emotion model and the instinct model provided by the emotion/instinct model unit 32, the elapsed time, and the environmental conditions recognized by the sensed signal processing unit 30. The action information representing the action corresponding to the destination node to be reached through transition (hereinafter, such an action will also be referred to as a transition action) is supplied to the emotion/distinct model unit 32 and the attitude changing unit 34.

Therefore, even under the same the environmental conditions recognized by the sensed signal processing unit 30, the action decided by the action decision unit 33 may be different depending upon the growth state represented by the growth model.

The action decision unit 33 modifies the occurrence probabilities set to the respective nodes in the action model, in accordance with the growth model.

Herein, if the transition probabilities set to the respective arcs in the action model are neglected, and if only the occurrence probabilities set to the respective nodes are taken into account, the sum of the probabilities set to the nodes is equal to 1. When there are four actions, "sleep", "rise", "walk", and "run" defined in the action model, if the occurrence probability of a certain action is represented by P(action), then P("sleep")+P("rise")+P("walk")+P("run")=1.

The sum of the occurrence probabilities set to the respective nodes is maintained at 1 even when the growth state of the robot changes. However, the probabilities of occurrence of actions corresponding to the respective nodes are changed by the action decision unit 33 as the robot grows.

For example, when the robot is in the "newborn baby" state in the growth model, the action decision unit 33 sets the occurrence probability of "sleep" to 1 and the occurrence probabilities of the other actions, "rise", "walk", and "run" to 0. Thus, the robot does not perform any action other than "sleep".

If the growth state of the robot is changed to the "infant" state in the growth model as a result of the elapsing of time, the action decision unit 33 slightly decreases the occurrence probability of "sleep" and increases the occurrence probability of "rise" by an amount corresponding to the reduction in the occurrence probability of "sleep". Furthermore, the action decision unit 33 gradually increases the occurrence probability of "walk" then that of "run" as the robot further grows. Thus, the robot, which always sleeps at first, becomes able to rise and then walk and run as it grows. That is, the robot becomes able to behave in increasingly various manners.

Even under the same environmental conditions recognized by the sensed signal processing unit 30, the action decision unit 33 decides a different action to be performed, depending upon not only the growth state but also the values of emotion model and the instinct model.

More specifically, for example, when the output of the sensed signal processing unit 30 indicates that a hand is held out in front of the robot such that the palm faces up, if the value associated with "anger" in the emotion model indicates that the robot is not angry and if the value associated with "appetite" in the instinct model indicates that the robot is not hungry, the action decision unit 33 decides, in response to the hand held out in front of the robot, that "shake hands" is the action to be performed next.

On the other hand, when the output of the sensed signal processing unit 30 indicates as in the previous example that a hand is held out in front of the robot such that the palm faces up, and the value associated with "anger" in the emotion model indicates that the robot is not angry, but if the value associated with "appetite" in the instinct model indicates that the robot is hungry, the action decision unit 33 decides that the robot should lick the hand as the action to be performed next.

In the case where when the output of the sensed signal processing unit 30 indicates as in the previous example that a hand is held out in front of the robot such that the palm faces up, the value associated with "anger" in the emotion model indicates that the robot is angry, the action decision unit 33 decides that the robot should turn away as the action to be performed next, regardless of the value associated with the "appetite" in the instinct model.

Furthermore, in response to a predetermined trigger, the action decision unit 33 makes a transition from the current node to another node in the action model thereby deciding the action to be performed next. More specifically, a transition is made when a predetermined period of time has elapsed since the robot started the current action, or when the output of the sensed signal processing unit 30 indicates that a particular result has been obtained in voice recognition, or when the growth model unit 31 indicates that the robot has reached a particular growth state, or when the emotion/instinct model unit 32 indicates that the value of the emotion model or the instinct model has reached a predetermined threshold.

Furthermore, the action decision unit 33 recognizes the current attitude of the robot on the basis of the outputs of the rotary encoders $12_1$ to $12_N$, and outputs action information to the attitude changing unit 34 so as to change the attitude in a natural fashion.

In accordance with the action information received from the action decision unit 33, the attitude changing unit 34 generates attitude changing information representing a transition to be made from the current attitude to another attitude. The generated attitude changing information is supplied to the motor controller 35. More specifically, the attitude changing unit 34 recognizes the current attitude via the action decision unit 33 on the basis of the outputs of the rotary encoders $12_1$ to $12_N$ and calculates the rotational angle and the rotation speed of the rotary encoders $12_1$ to $12_N$ required for the robot to perform the action (transition action) specified by the action information received from the action decision unit 33. The result is supplied as attitude changing information to the motor controller 35.

In accordance with the attitude changing information from the attitude changing unit 34, the motor controller 35 generates driving signals for driving the motors $7_1$ to $7_N$ and supplies them to the motors $7_1$ to $7_N$. Thus, the motors $7_1$ to $7_N$ are driven so as to rotate in response to the driving signals thereby changing the attitude of the robot.

Figure 7:
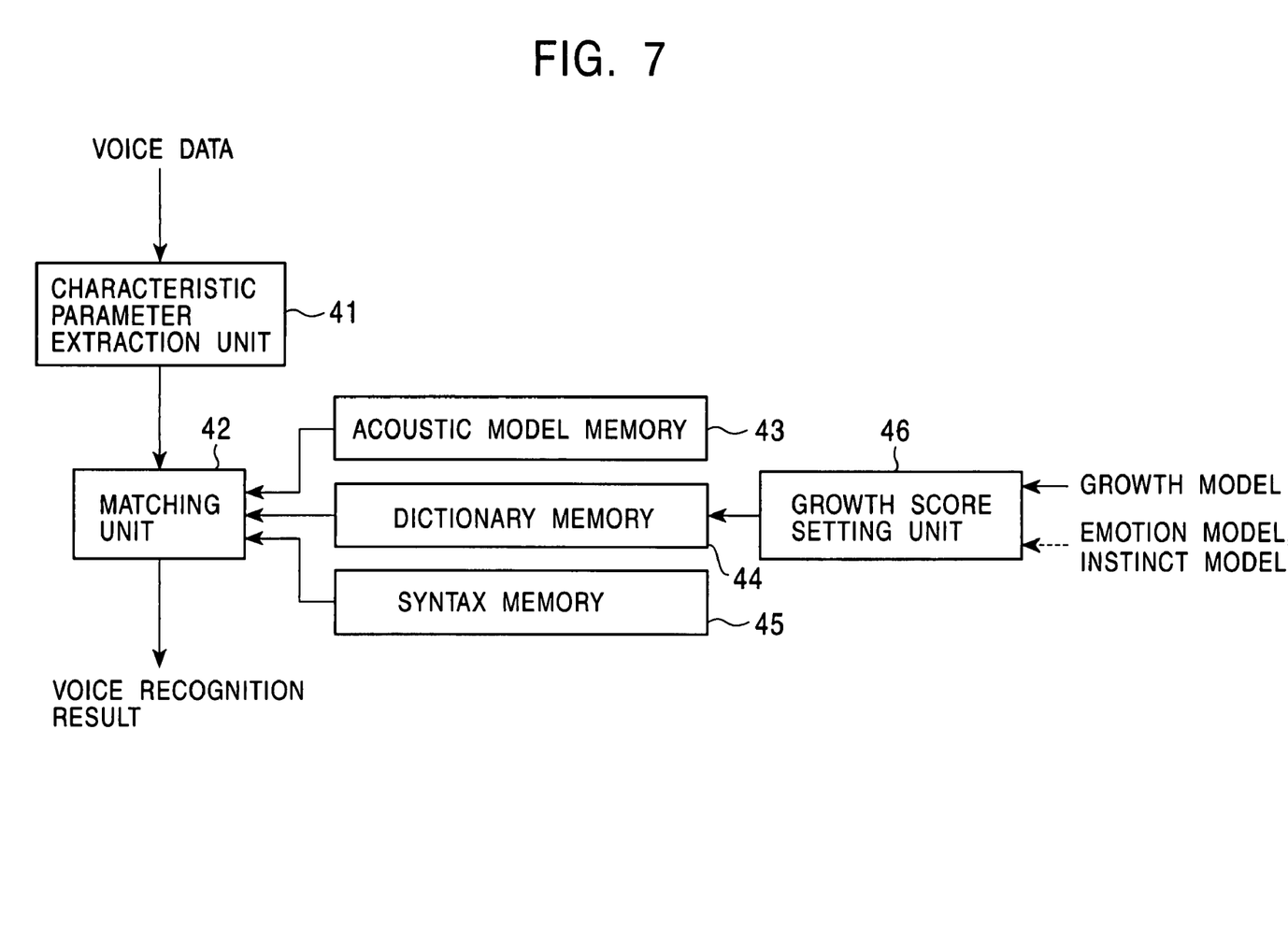
FIG. 7 is a block diagram illustrating an example of the configuration of a voice recognition apparatus which is included in a sensed signal processing unit and which serves to perform voice recognition.

FIG. 7 illustrates an example of the functional configuration of a part of the sensed signal processing unit 30 shown in FIG. 4, which performs voice recognition using voice data output from the microphone 9 (hereinafter, this part of the sensed signal processing unit 30 will be referred to as a voice recognition apparatus).

The voice recognition apparatus recognizes the voice input via the microphone 9 in accordance with the continuously distributed HMM (Hidden Markov Model) algorithm and outputs the result of the voice recognition.

The voice data output from the microphone 9 is supplied to a characteristic parameter extraction unit 41. The characteristic parameter extraction unit 41 performs, for example, MFCC (Mel Frequency Cepstrum Coefficient) analysis upon the input voice data every predetermined number of frames. The analysis result is output as a characteristic parameter (feature vector) to a matching unit 42. The characteristic parameter extraction unit 41 may also extract, for example, linear prediction coefficients, cepstrum coefficients, line spectrum pairs, or power for each predetermined frequency band (filter bank output), as the characteristic parameters.

Using the characteristic parameter output by the characteristic parameter extraction unit 41, the matching unit 42 recognizes the voice (input voice) input via the microphone 9 in accordance with the continuously distributed HMM algorithm by referring to an acoustic model memory 43, a dictionary memory 44, and a grammar memory 45 as required.

The acoustic model memory 43 stores an acoustic model representing acoustic characteristics of respective phonemes and syllables of the language of voices to be recognized. In the present embodiment, because the voice recognition is performed using the continuously distributed HMM algorithm, the acoustic model is based on the HMM (Hidden Markov Model). The dictionary memory 44 stores a word dictionary describing information about pronunciations of the respective words to be recognized. The grammar memory 45 stores a grammar describing how the respective words stored in the word dictionary 35 can be concatenated (connected) with each other. As for the grammar, a context-free grammar (CFG), a statistical word concatenation probability model (N-gram) or the like may be employed.

The matching unit 42 creates an acoustic model of words (word model) by applying the acoustic model stored in the acoustic model memory 43 to the words described in the word dictionary stored in the dictionary memory 44. Furthermore, the matching unit 42 concatenates some word models with each other on the basis of the grammar stored in the grammar memory 45 and recognizes the voice input via the microphone 9 using the word model obtained by the concatenation, in accordance with the continuously distributed HMM method. That is, the matching unit 42 detects a series of word models having a highest score (most likelihood) in terms of the characteristic parameters output in time sequence from the characteristic parameter extraction unit 41, and employs the series of words corresponding to the detected series of word models as the result of voice recognition.

More specifically, the matching unit 42 calculates the sum of the occurrence probabilities of characteristic parameters input in time sequence for a series of words corresponding to the word model obtained by the concatenation, and employs the sum as the score of the series of words. Of various series of words, one which has a highest score is employed as the voice recognition result. The voice recognition result given by the matching unit 42 is output from the sensed signal processing unit 30 to the growth model unit 31, the instinct/instinct model unit 32, and the action decision unit 33, as described earlier.

If the scores are calculated for all possible series of words described in the word dictionary stored in the dictionary memory 44, the required calculations become huge. Therefore, the series of words to be calculated in terms of the score are limited by the grammar stored in the grammar memory 45. The matching unit 42 may perform weighting such that series of words with high occurrence probabilities will have high scores.

The matching unit 42 determines the score by totally evaluating the acoustic score given on the basis of the acoustic model stored in the acoustic model memory 43 (hereinafter referred to simply as an acoustic score) and the linguistic score given on the basis of the grammar stored in the grammar memory (hereinafter referred to simply as an linguistic score).

More specifically, when a series of N words is given, if the kth word is represented by $W_k$ and the acoustic and linguistic scores of the work $W_k$ are represented by $A(W_k)$ and $L(W_k)$, respectively, the score S of that series of words can be calculated as follows:

$$S = \Sigma(A(W_k) + C_k \times L(W_k)) \tag{1}$$

where $\Sigma$ represents the summation for k=1 to N, and $C_k$ represents the weighting factor for the linguistic score $L(W_k)$ of the word $W_k$.

The word dictionary stored in the dictionary memory 44 disposed in the voice recognition apparatus defines the words which can be dealt with by the robot. In this respect, the word dictionary is very important. That is, if the word dictionary include a large number of words, the robot can deal with various kinds of speeches.

However, because the functions of the voice recognition apparatus shown in FIG. 7 are realized by executing the program with the CPU 20 shown in FIG. 3, the maximum number of words described in the word dictionary is limited by the processing capacity of the CPU 20 and the available memory space of the RAM 22 used by the CPU 20.

The voice waveform for each word becomes slightly different speech by speech even if the same word is pronounced by the same person. Therefore, the matching process (score calculation) performed by the matching unit 42 has to deal with ambiguity included in the input voice. This can cause the input voice to be recognized incorrectly as a series of words which was not actually spoken. The probability of such incorrect recognition increases with the number of words included in the word dictionary, because the number of acoustically similar words increases with the number of words included in the word dictionary.

Thus, the maximum number of words the word dictionary can include is limited not only by the processing capacity of the CPU 20 and the storage capacity of the RAM 22 but also by the recognition accuracy required.

A growth score setting unit 46 controls the voice recognition performed by the voice recognition apparatus in accordance with the growth model. That is, in the embodiment shown in FIG. 7, the growth score setting unit 46 controls the word dictionary stored in the dictionary memory 44 in accordance with the growth model thereby controlling the voice recognition.

More specifically, for example, the growth score setting unit 46 calculates the growth score indicating the degree of ability of understanding the words described in the word dictionary, for the respective growth states of the robot. Herein, when the probability of understanding a certain word W in a certain growth state of the robot is represented by P(W), the growth score setting unit 46 calculates the growth score G(W) associated with the word W in accordance with the following equation:

$$G(W) = -\log(P(W)) \quad (2)$$

Figure 8:
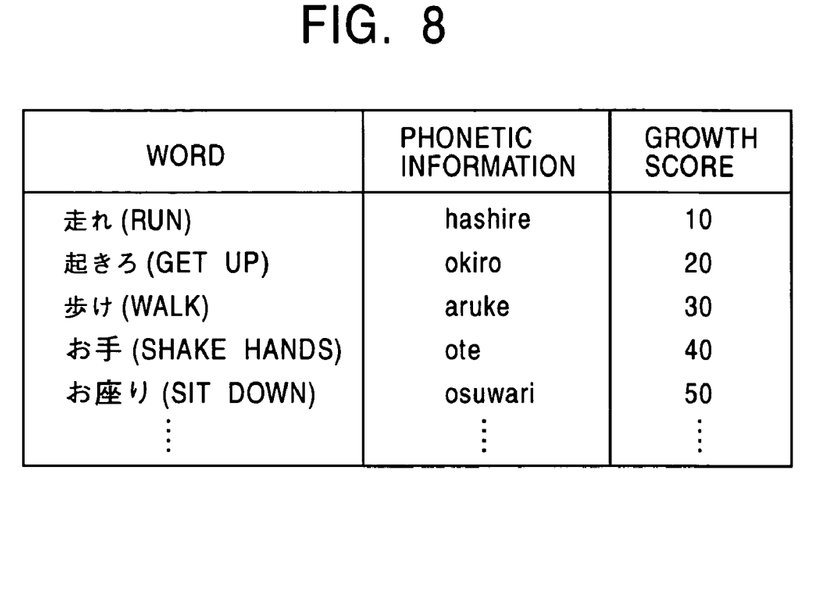
FIG. 8 is a schematic diagram illustrating a word dictionary.

Furthermore, the growth score setting unit 46 relates the growth score to the corresponding word in the word dictionary stored in the dictionary memory 44. Thus, in the word dictionary stored in the dictionary memory 44, unlike usual word dictionaries in which information such as spelling which identifies words is described together with phonemic information of corresponding words, the growth scores are also described together with the spelling and the phonetic information of the words as shown in FIG. 8. In the specific example shown in FIG. 8, the growth scores 10, 20, 30, 40, 50, and so on are assigned to words "走れ", "起きろ", "歩け", "お手", "お座り", and so on. Herein, "走れ", "起きろ", "歩け", "お手", and "お座り" are Japanese words corresponding to English words "run", "get up", "walk", "shake hands", and "sit down" enclosed in parentheses in FIG. 8, and corresponding Japanese pronunciations are described as the phonetic information. Note that the language is not limited to Japanese and words in English or other languages may also be described in the word dictionary in a similar manner.

In the case where the growth scores are defined in the word dictionary stored in the dictionary memory 44 as shown in FIG. 8, the matching unit 42 determines the score of a series of words on the basis of not only the acoustic scores and the linguistic scores but also the growth scores. More specifically, the matching unit 42 calculates the score S using equation (3) shown below instead of equation (1).

$$S = \Sigma(A(W_k) + C_k \times L(W_k) + D_k \times G(W_k)) \quad (3)$$

where $G(W_k)$ represents the growth score for the kth word $W_k$ and the $D_k$ represents the weighting factor for the growth score $G(W_k)$.

By introducing the growth scores into the calculation of the score S performed by the matching unit 42 as described above, it becomes possible to modify the recognition accuracy of the voice recognition apparatus depending upon the growth state of the robot.

More specifically, for example, when the growth state of the robot is the "infant" state, a smaller growth score is given to the word "run" than given to the other words in the word dictionary shown in FIG. 8 thereby reducing the voice recognition accuracy for "run". As a result, when a word "run" is voiced, voice recognition is intentionally performed in an incorrect manner instead of correctly recognizing the voiced word as "run", thereby causing the robot not to run or to perform an action other than running.

The growth score for the word "run" is gradually increased as the robot grows, thereby making the robot able to correctly recognize the voiced word "run" and thus making the robot run in response to the voiced word "run".

In the case of human beings, the number of words we can understand increases with the growth (or via learning). In an analogy to human beings, the voice recognition accuracy is changed with the growth score given by the growth model.

Figure 9:
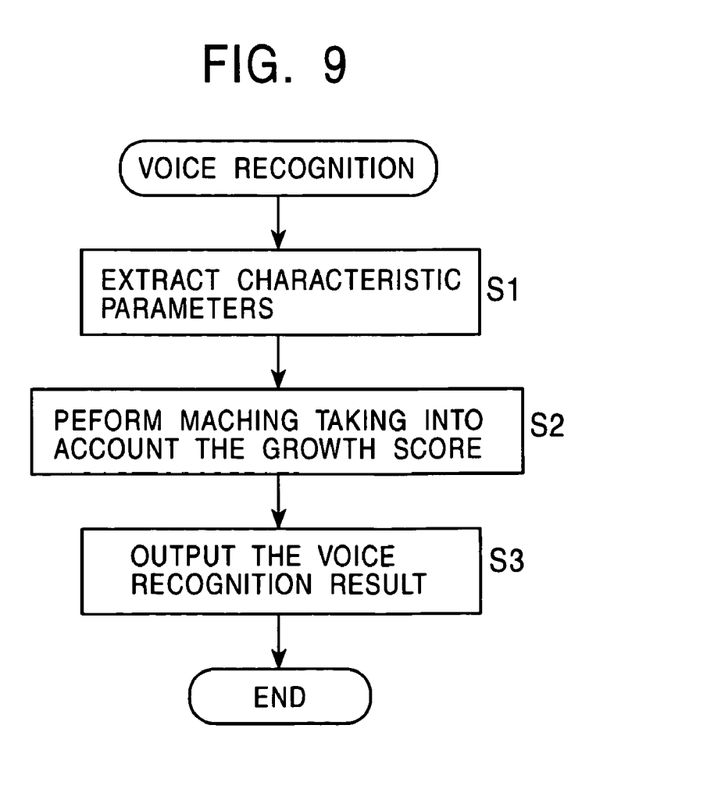
FIG. 9 is a flow chart illustrating the operation of the voice recognition apparatus shown in FIG. 7.

Referring to the flow chart shown in FIG. 9, the operation of the voice recognition apparatus shown in FIG. 7 is described in further detail below.

If a voice is input to the microphone 9, and thus if corresponding voice data is supplied to the sensed signal processing unit 30, the voice data is supplied to the characteristic parameter extraction unit 41.

In step 1, the characteristic parameter extraction unit 41 performs acoustic analysis upon the received voice data so as to extract the characteristic parameters thereof in time series. The extracted characteristic parameters are supplied to the matching unit 42. In step S2, the matching unit 42 calculates the scores using the characteristic parameters supplied by the characteristic parameter extraction unit 41 according to equation (3) taking into account the growth scores. Furthermore, on the basis of the calculated scores, the matching unit 42 determines the voice recognition result for the voice input via the microphone 9. After that, in step S3, the matching unit 42 supplies the voice recognition result to the growth model unit 31, the emotion/instinct model unit 32, and the action decision unit 33. Thus, the process is completed.

In the example described above, the voice recognition accuracy of the voice recognition apparatus is changed by changing the growth scores for the respective words described in the word dictionary, depending upon the growth state of the robot given on the basis of the growth model. Alternatively, the voice recognition accuracy may be changed by changing the parameters which define the acoustic model stored in the acoustic model memory 43 or the grammar stored in the grammar memory 45 depending upon the growth state of the robot.

Because the voice recognition apparatus performs voice recognition for the words which are included in the word dictionary, it is possible to change the words which can be recognized by the voice recognition apparatus by changing the words included in the word dictionary. More specifically, the words which can be recognized in voice recognition can be changed by adding new words to the word dictionary or deleting particular word from the word dictionary depending upon the growth state of the robot/

Although in the above-described example, the voice recognition accuracy of the voice recognition apparatus is changed depending upon the growth state of the robot, the voice recognition accuracy may also be changed depending upon the state of the emotion or instinct of the robot. In order to change the voice recognition accuracy depending upon the state of the emotion or instinct of the robot, the information about the state of the emotion or instinct represented on the basis of the emotion model or the instinct model is supplied from the emotion/instinct model unit 32 to the sensed signal processing unit 30 as represented by the broken lines in FIG. 4, and the information is applied to the growth score setting unit 46 as represented by the broken line in FIG. 7 so as to determine emotion scores and instinct scores on the basis of the emotion model or the instinct model and describe them in the word dictionary in a similar manner to the growth scores. In this case, if matching unit 42 determines the final score taking into account the emotion scores or the instinct scores, the voice recognition accuracy is changed depending upon the state of the emotion or the instinct of the robot.

More specifically, if the emotion scores or the instinct scores are taken into account in the voice recognition, it is possible to increase the voice recognition accuracy for words "shake hands" or "sit down" when the robot is in a good humor so that the robot correctly recognizes voiced words "shake hands" and "sit down" and performs a correct corresponding action. On the other hand, when the robot is in a bad humor, the voice recognition accuracy for words "shake hands" or "sit down" may be decreased so that the robot incorrectly recognizes voiced words "shake hands" and "sit down" and performs an action which does not correspond to the voiced word thereby representing the bad mood.

In addition to human voices, the voice recognition apparatus shown in FIG. 7 may recognize sounds such as a clapping sound, a sound generated when a some part of the robot is hit, a sound generated by a musical instrument, a sound generated in the environment surrounding the robot, a musical sound, and the like. In the case where voice recognition is performed according to the continuously distributed HMM method, recognition of desired voices or sounds becomes possible by modeling the voices or sounds according to the HMM method. When recognition is performed for sounds other than human voices, the recognition accuracy may be changed depending upon the growth state, the state of the emotion, or the state of the instinct of the robot.

Instead of describing all words to be recognized in a single word dictionary, the words to be recognized may be divided into a plurality of groups (different groups are allowed to include the same word) and the respective groups of words may be described in different word dictionaries. In the case where a plurality of word dictionaries are provided for the respective groups words, voice recognition of voiced words is generally performed not using all dictionaries but using one or more of the dictionaries.

As described earlier, the maximum number of words which can be recognized is limited not only the processing capacity of the CPU 20 and the storage capacity of the RAM 22 but also by the recognition accuracy required.

In view of the above, a plurality of word dictionaries are prepared, and the word dictionary used in voice recognition may be switched depending upon the recognition accuracy required or other factors.

The words to be dealt with in the voice recognition may be grouped in accordance with the domains (themes) such as travel, baseball, news, and so on, and they may be described in different dictionaries. In voice recognition, a proper dictionary is selected in accordance with the situation. This allows an increase in the recognition accuracy for words in a particular theme (for example, proper nouns such as regional names, the names of baseball players, the names of companies).

The technique of performing voice recognition using a particular dictionary selected from a plurality of dictionaries can be applied to the voice recognition apparatus shown in FIG. 7.

For example, the words to be dealt with in voice recognition are divided into Q groups and described in Q word dictionaries $D_1, D_2, \ldots, D_Q$. The resultant Q dictionaries are stored in the dictionary memory 44.

Figure 10:
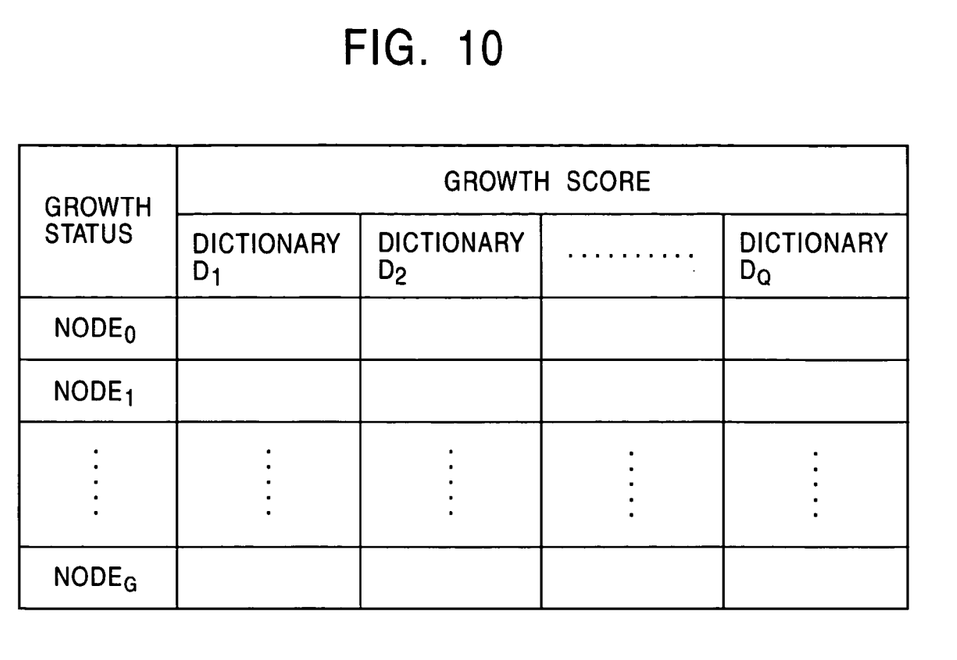
FIG. 10 is a schematic diagram illustrating a dictionary growth score table.

Furthermore, a dictionary growth score table such as that shown in FIG. 10 is created in which growth scores are assigned to the respective Q dictionaries $D_1, D_2, \ldots, D_Q$ depending upon the growth state of the robot, and the dictionary growth score table is stored in the growth score setting unit 46.

More specifically, in FIG. 10, growth scores are set to the respective word dictionaries $D_1$ to $D_Q$ for each growth state of the robot represented by the corresponding node in the growth model shown in FIG. 5A.

When the current growth state (node) of the robot is given, it is possible to determine the growth scores for the respective word dictionaries $D_1$ to $D_Q$ by referring to the dictionary growth score table shown in FIG. 10.

The growth score setting unit 46 describes the growth scores determined from the dictionary growth score table, for each word in the respective word dictionaries $D_1$ to $D_Q$ in a similar manner to the previous example. The matching unit 42 performs the matching process taking into account the growth scores defined in the dictionaries $D_1$ to $D_Q$.

When the same word is described in two or more different dictionaries, the greatest growth score, for example, of the growth scores assigned to those two or more dictionaries is assigned to that word. Words assigned a growth score of 0 are not dealt with in the voice recognition. In other words, voice recognition is performed only for those words which are described in the word dictionaries and which have growth scores greater than 0.

The voice recognition accuracy can also be changed by setting the growth scores to the dictionaries depending upon the growth state of the robot as described above.

More specifically, in the dictionary growth score table shown in FIG. 10, growth scores are assigned to the respective dictionaries for the "newborn baby" growth state in such a manner that a growth score of 70 is assigned to the word dictionary $D_1$, a growth score of 30 to the word dictionary $D_2$, and a growth score of 0 to the other word dictionaries $D_3$ to $D_Q$. As for the "infant" growth state, growth scores of 40, 10, and 50 are assigned to the word dictionaries $D_1$, $D_2$, and $D_3$, respectively, and the other word dictionaries $D_4$ to $D_Q$ are assigned a growth score of 0.

In this case, when the robot is in the "newborn baby" growth state, voice recognition is performed only for the words described in the word dictionaries $D_1$ and $D_2$. Herein, if only three words, for example, "crawl", "daddy", and "mom" are included in the word dictionaries $D_1$ and $D_2$, voice recognition is correctly performed only for these three words.

In the present example, because the growth score assigned to the word dictionary $D_1$ is 70 and that to the word dictionary $D_2$ is 30, that is, because the growth score for the word dictionary $D_1$ is greater than that for the word dictionary $D_2$, the words included in the word dictionary $D_1$ are recognized more accurately than the word included in the word dictionary $D_2$.

When the robot has grown to the "infant" state, voice recognition is performed for the words included in the word dictionaries $D_1$, $D_2$, and $D_3$. If two words "shake hands" and "sit down" are included in the word dictionary $D_3$, the words "shake hands" and "sit down" are correctly recognized in addition to the above three words "crawl", "daddy", and "mom".

In the present example, when the growth state is changed from the "newborn baby" to "infant", the growth score for the word dictionary $D_1$ is reduced from 70 to 40 and that for the word dictionary $D_2$ is reduced from 30 to 10. As a result, the recognition accuracy for the words included in the word dictionaries $D_1$ and $D_2$ becomes lower when the growth state is changed from the "newborn baby" to "infant". In the "infant" growth state, the word dictionary $D_3$ has a growth score of 50 which is greater than the growth scores for the word dictionaries $D_1$ and $D_2$. As a result, in the "infant" growth state, although it becomes possible to recognize the words "shake hands" and "sit down" in addition to the three words "crawl", "daddy", and "mom", the recognition accuracy for these three words "crawl", "daddy", and "mom" becomes lower than that for the words "shake hands" and "sit down". That is, as the robot grows, the robot gradually loses the ability of understanding the words which are used when the robot is in the infant growth state.

The technique described above is useful in particular when there is a limitation in the hardware, because voice recognition is performed using one or more particular word dictionaries selected from the plurality of word dictionaries, and thus it becomes possible to perform voice recognition within the limitation in terms of hardware.

In the case where a plurality of word dictionaries are provided for use in voice recognition as described above, the emotion scores or the instinct scores may be assigned, instead of the growth scores, to the respective word dictionaries.

When a growth model having a tree structure such as that shown in FIG. 5B is employed instead of the growth model shown in FIG. 5A, growth scores may be described in the dictionary growth score table shown in FIG. 10 such that growth scores are assigned to the respective word dictionaries for each growth state represented by the corresponding node shown in FIG. 5B. In this case, the "infant" growth state can correspond to either one of $NODE_{1-0}$ or $NODE_{1-1}$. The words which can be recognized and the voice recognition accuracy may be different between $NODE_{1-0}$ and $NODE_{1-1}$ although both nodes correspond to the "infant" growth state.

For example, when the robot grows from the "newborn baby" growth state corresponding to $NODE_0$ to the "infant" growth state corresponding to $NODE_{1-0}$, the robot may become able to recognize new words "shake hands" and "sit down" in addition to the words "crawl", "daddy", and "mom" which can be recognized also in the "newborn baby" growth state. On the other hand, when the robot grows from the "newborn baby" growth state corresponding to $NODE_0$ to the "infant" growth state corresponding to $NODE_{1-1}$, the robot may become able to recognize new words "shake hands" and "sit down" however the robot becomes unable to recognize the words "crawl", "daddy", and "mom" which can be recognized in the "newborn baby" growth state.

The voice recognition apparatus shown in FIG. 7 cannot correctly recognize a word (unknown word) which is not included in the dictionary stored in the dictionary memory 44.

In order to make it possible to correctly recognize an unknown word, the word is added to the word dictionary. The addition of words to the dictionary may be performed, for example, by operating a keyboard or the like connected to the robot via an input interface thereby inputting the spellings and the pronunciations of the words to be added.

As described earlier, the maximum number of words which can be described so as to be dealt with in the voice recognition is limited by the capacity of the CPU 20 or RAM 22 or by the recognition accuracy. In view of the above, the number of words allowed to be added to the word dictionary may be limited within a particular range.

That is, the maximum number of words which are allowed to be added to the word dictionary may be limited depending upon the growth state of the robot. More specifically, when the robot is in the "newborn baby" growth state, only several words may be allowed to be newly described in the word dictionary. The maximum number of words allowed to be added to the word dictionary is increased to several tens and further several hundreds as the robot grows. In this case, the number of words the robot can understand increases as the robot grows.

The maximum number of words allowed to be added to the word dictionary may also be changed depending upon the emotion score or the instinct score.

In addition to the voice recognition, the sensed signal processing unit 30 also performs image recognition upon an image input via the camera 8. Also in the image recognition, colors and patterns such as that of a face may be registered in advance, and new colors and patterns may be further registered later. Also in this case, the maximum number of colors and patterns allowed to be added may be changed depending upon the growth state of the robot or the emotion state or the instinct state of the robot.

In the voice recognition apparatus shown in FIG. 7, as described above, a series of words having a highest score is output as the voice recognition result. In usual applications, it is desirable that the voice recognition result be very accurate.

However, in the voice recognition apparatus shown in FIG. 7, which is used in the robot, an incorrect recognition result may be intentionally output so as to make it more enjoyable for the user to communicate and interact with the robot. In two-man comic acts, one of a comic duo behaves as a stooge such that he/she mistakes a word included in a speech made by the other for another word which is acoustically similar but which is absolutely different in meaning. The other one of the comic duo responds critically to the misunderstanding. In an analogy to the two-man comic acts, it is possible to make the robot behave as a stooge or a critical respondent by intentionally outputting a wrong voice recognition result from the voice recognition apparatus.

The behavior as a stooge can be realized as follows.

Figure 11:
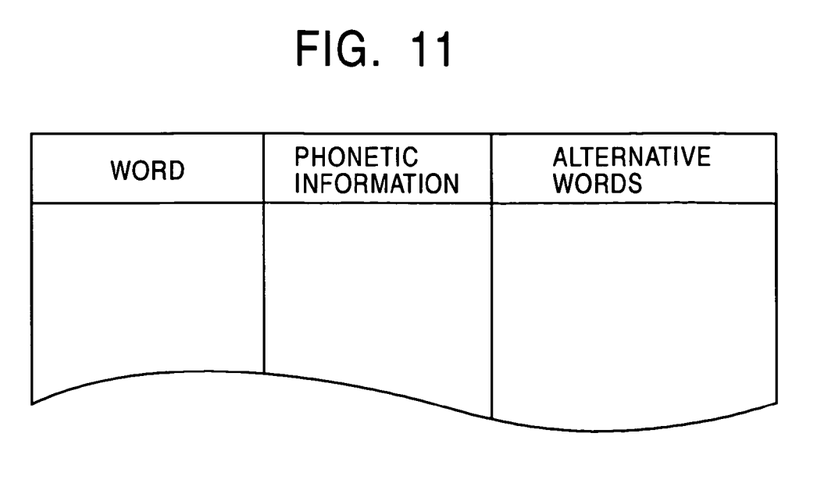
FIG. 11 is a schematic diagram illustrating a word dictionary used to realize a stooging behavior.

In the word dictionary including a list of words and their phonetic information, wrong words which are similar in pronunciation to correct words to be recognized but which are different in meaning from the correct words are linked to the correct words, or words which are not similar in pronunciation to correct words but which are reminded of by the correct words are linked to the correct words, as shown in FIG. 11 (herein, such a wrong word will be referred to as a word for replacement). The matching unit 42 outputs, as a final voice recognition result, a word for replacement linked to a correct word described in the word dictionary, instead of outputting the correct word obtained via the voice recognition.

In this case, the action decision unit 33 decides the action to be performed next, in accordance with the replaced word given as the final voice recognition result, and thus the robot behaves as a stooging comedian without correctly responding to the content of a speech made by the user.

The stooging behavior may also be realized by providing a plurality of word dictionaries as described above, and by performing voice recognition using a wrong word dictionary instead of a correct word dictionary thereby outputting, as a voice recognition result, a wrong word which is acoustically similar to the word voiced by the user.

It is desirable to determine whether to intentionally output a wrong voice recognition result from the voice recognition apparatus, using a state transition model having two states corresponding to "stooging" and not "stooging", such that such a wrong voice recognition result is output randomly and infrequently. The manner of transition in the state transition model may be changed depending upon the growth model, the emotion model, or the instinct model.

When a stooging speech is made by the user, the robot may critically respond to the stooging speech. This can be achieved in a similar manner to the stooging behavior.

Also in this case, the word dictionary such as that shown in FIG. 11, in which words for replacement are linked to correct words to be dealt with in the voice recognition, is used. Because it is difficult for the voice recognition apparatus to determine whether the user has made a speech in a stooging manner, the matching unit 42 simply employs, as the final voice recognition result, the word for replacement corresponding to a correct word obtained via the voice recognition, instead of employing the correct word.

When a stooging speech is made by the user, a correct word which should have been used by the user is output as a result of word replacement performed by the voice recognition apparatus. The action decision unit 33 decides the action to be performed next, in accordance with the word which has become correct as a result of the word replacement. Thus, the robot critically responds to the stooging speech made by the user.

As described above, the voice recognition is controlled depending upon the state of the robot so that the manner of voice recognition is varied depending upon the state, such as the growth state, of the robot thereby allowing the robot to provide good entertainment to the user.

In the embodiments described above, the invention is applied to an entertainment robot (pet robot) by way of example but not by way of limitation. The present invention may also be applied to a wide variety of robots such as industrial robots.

In the embodiments described above, the motors $7_1$ to $7_N$ are employed as the driving means for making the robot perform actions. Alternatively, various types of driving means, such as an actuator, a loudspeaker, a buzzer, or an illuminator, may also be employed as long as they can drive the robot to perform an action appearing to the outside.

Furthermore, in the embodiments described above, a sequence of processing is performed by executing the program using the CPU 20. Alternatively, the sequence of processing may also be performed by dedicated hardware.

Instead of storing the program in advance in the program memory 21 (FIG. 3), the program may be stored (recorded) temporarily or permanently on a removable storage medium such as a floppy disk, a CD-ROM (Compact Disc Read Only Memory), an MO (Magnetooptical) disk, a DVD (Digital Versatile Disc), a magnetic disk, or a semiconductor memory. A removable storage medium on which the program is stored may be provided as so-called packaged software thereby allowing the program to be installed on the robot (program memory 21).

Instead of installing the program from the a removable storage medium, the program may also be installed in the program memory 21 by downloading the program from a program providing site via a digital broadcasting satellite or via a network such as wireless communication network, a LAN (Local Area Network), or the Internet, or via a cable communication network.

In this case, when the program is upgraded, the upgraded program may be easily installed in the program memory 21.

In the present invention, the processing steps described in the program to be executed by the CPU 20 for performing various kinds of processing are not necessarily required to be executed in time sequence according to the order described in the flow chart. Instead, the processing steps may be performed in parallel or separately (by means of parallel processing or object processing).

The program may be executed either by a single CPU or by a plurality of CPUs in a distributed fashion.

In the embodiments described above, the voice recognition is performed in accordance with the continuously distributed HMM method. Alternatively, the voice recognition may also be performed by means of matching between spectrum waveforms.

As described above, the present invention provides great advantages. That is, the voice recognition apparatus, the voice recognition method, and the storage medium according to the present invention allows the voice recognition to be controlled depending upon the state of the robot such that the manner of voice recognition is varied depending upon the state of the robot. Thus, the robot according to the present invention can provide good entertainment to the user.

What is claimed is:

1. A speech recognition apparatus disposed in a device, comprising:

speech recognition means for recognizing speech including a dictionary in which words to be recognized in speech recognition are described;

control means for controlling said speech recognition means in accordance with a growth state of said device, wherein said growth state is comprised of a plurality of nodes corresponding to increasing maturity levels for said device; and action decision means for determining and performing a predetermined action in accordance with the speech recognized by said speech recognition means and an occurrence probability of the predetermined action as determined by the growth state, wherein said control means controls said speech recognition means such that the words described in said dictionary are weighted in accordance with the growth state of said device and speech recognition is performed using the weighted words, wherein coefficients for said weighted words are controlled by the growth state, and wherein the occurrence probability is based on data collected from distinct behavior and environmental models comprised of a plurality of nodes representing unique actions.

2. A speech recognition apparatus according to claim 1, wherein said control means changes the recognition accuracy of said speech recognition means in accordance with the growth state of said device.

3. A speech recognition apparatus according to claim 1, wherein:

said speech recognition means includes dictionary storage means for storing a plurality of dictionaries in which words to be recognized in speech recognition are described such that the words to be recognized are divided into groups and the respective groups of words are stored in different dictionaries; and said control means controls said speech recognition means such that the words described in the respective dictionaries are weighted in accordance with the growth state of said device and speech recognition is performed using the weighted words.

4. A speech recognition apparatus according to claim 1, wherein:

said control means controls the maximum number of words allowed to be described in said dictionary, in accordance with the growth state of said device.

5. A speech recognition apparatus according to claim 1, wherein:

said speech recognition means includes a dictionary in which words to be recognized in speech recognition are described such that other words are linked to said words to be recognized; and said control means controls said speech recognition means such that another word linked to a word, which is included in the dictionary and which is obtained as a speech recognition result, is output as a final speech recognition word depending upon the growth state of the device.

6. A speech recognition apparatus according to claim 5, wherein words to be recognized in speech recognition are described in said dictionary such that said words are linked to other acoustically or semantically similar words.

7. A speech recognition method for a speech recognition apparatus disposed in a device, comprising the steps of:

recognizing speech using a dictionary in which words to be recognized in speech recognition are described;

controlling said speech recognition step in accordance with a growth state of said device, wherein said growth state is comprised of a plurality of nodes corresponding to increasing maturity levels for said device; and determining and performing a predetermined action in accordance with the speech recognized in said speech recognition step and an occurrence probability of the predetermined action as determined by the growth state, wherein said control step controls said speech recognition means such that the words described in said dictionary are weighted in accordance with the growth state of said device and speech recognition is performed using the weighted words, wherein coefficients for said weighted words are controlled by the growth state, and wherein the occurrence probability is based on data collected from distinct behavior and environmental models comprised of a plurality of nodes representing unique actions.

8. A computer-readable medium storing a computer program capable of being executed by a computer, causing a device comprising the computer to perform speech recognition, comprising the steps of:

recognizing speech using a dictionary in which words to be recognized in speech recognition are described;

controlling said speech recognition step in accordance with a growth state of said device, wherein said growth state is comprised of a plurality of nodes corresponding to increasing maturity levels for said device; and determining and performing a predetermined action in accordance with the speech recognized in said speech recognition step and an occurrence probability of the predetermined action as determined by the growth state, wherein said control step controls said speech recognition means such that the words described in said dictionary are weighted in accordance with the growth state of said device and speech recognition is performed using the weighted words, wherein coefficients for said weighted words are controlled by the growth state, and wherein the occurrence probability is based on data collected from distinct behavior and environmental models comprised of a plurality of nodes representing unique actions.

* * * * *